United States Patent [19]

Venant

[11] Patent Number: 4,873,883
[45] Date of Patent: Oct. 17, 1989

[54] MECHANICAL TRANSMISSION MANUAL CONTROL DEVICE

[75] Inventor: André Venant, Meyzieu, France

[73] Assignee: Renault Vehicules Industriels, Lyons, France

[21] Appl. No.: 116,686

[22] Filed: Nov. 4, 1987

[30] Foreign Application Priority Data

Nov. 7, 1986 [FR] France ............................ 86 15547

[51] Int. Cl.⁴ ............................................. F16H 57/06
[52] U.S. Cl. .................................... 74/473 R; 74/522
[58] Field of Search ................ 74/473 P, 473 R, 522, 74/525

[56] References Cited

U.S. PATENT DOCUMENTS 2,951,392 9/1960 Backus .............................. 74/473 R

FOREIGN PATENT DOCUMENTS

| 2700837 | 7/1978 | Fed. Rep. of Germany | .... 74/473 R |
| 2904064 | 8/1980 | Fed. Rep. of Germany | .... 74/473 R |
| 3019967 | 12/1981 | Fed. Rep. of Germany | . |
| 3201972 | 8/1983 | Fed. Rep. of Germany | .... 74/473 R |
| 1399342 | 9/1965 | France | . |
| 2184218 | 12/1973 | France | . |
| 2254197 | 4/1975 | France | . |
| 2365841 | 4/1978 | France | . |
| 2449924 | 9/1980 | France | . |
| 8301889 | 12/1984 | Netherlands | ...................... 74/473 R |

Primary Examiner—Leslie A. Braun
Assistant Examiner—Scott Anchell
Attorney, Agent, or Firm—Oblon, Spivak, McClelland, Maier & Neustadt

[57] ABSTRACT

Mechanical transmission manual control device includes a gear control lever (1) which is hinged around a shifting ball (11) to operate a main control connecting rod (2). A lever (12) is solid with the main control connecting rod (2) which operates a transmission control connector (4) carrying a selector (7), the lever (12) working, for selection of the gears, with a reaction link (3) which is connected by its other end (13) to a stationary element (8). There is also provided an element for modification of one of the elements of the kinematic chain which are placed between the knob (14) of the gear control lever (1) and the selector (7), i.e., the control lever (1), the main control connecting rod (2), the reaction link (3), and the control connector (4) to modify the relative position of the knob (14) and the selector (7) in relation to one another.

11 Claims, 5 Drawing Sheets

MECHANICAL TRANSMISSION MANUAL CONTROL DEVICE

BACKGROUND OF THE INVENTION

The invention relates to a mechanical transmission manual control device which is applied particularly to controls of industrial vehicles.

BACKGROUND OF THE RELATED ART

Modern industrial vehicles require transmissions having a large number of forward gears which currently are 8 in number. For this purpose, it is necessary to have four selection slots and therefore five slots including reverse. For this reason, there is a very large selection surface.

The too great distance between the first slot and the last slot causes a bad position for the driver who must, for some shifts, apply a backward force at the end full extension of his arm and backward. This very poor ergonomic position is unacceptable on modern vehicles.

To avoid the latter drawback, an additional control is available which acts on the splitter unit and, therefore, the first gear position becomes the fifth gear position, the second gear position becomes the sixth, the third becomes the seventh and the fourth becomes the eight, hence a selection overall dimension which is reduced by half.

This solution has a drawback in case the driver forgets to act again on the splitter unit control. He believes that he is going from fourth to fifth, whereas he suddenly engages first gear in going from fourth gear. This configuration causes an overspeed of the engine and clutching with a danger of destruction of elements.

SUMMARY OF THE INVENTION

The object of this invention is to provide a transmission manual control device which, while maintaining a control grid with a reduced selection size, makes it possible to avoid any forgetting of the range shift by a simple circuit.

According to an embodiment of the invention, the mechanical transmission manual control device comprises a gear control lever which is hinged around a shifting ball to operate a main control connecting rod, a lever is solid with the main control connecting rod which operates a transmission control connector carrying a selector, the lever working, for selection of the gears, with a reaction link which is connected by its other end to a stationary element. The device comprises means for modification of one of the elements of the kinematic chain which are placed between the knob of the gear control lever and the selector, i.e., the control lever, the main control connecting rod, the reaction link and the control connector to modify the relative position of the knob and the selector in relation to one another.

According to an embodiment of the invention, the modification means are applied to the reaction link and consist of a modification of the length between the end of the lever and point of attachment to the stationary element.

According to an embodiment of the invention, the means for modification of the length between the end of the lever and the point of attachment to the stationary element consist of a reversing lever one of whose ends is mounted on a joint connected to the stationary element, and whose other end is fastened to the rod of an actuator connected to a stationary element by a joint, the reversing lever being connected to the end of the reaction link.

According to an embodiment of the invention, the means for modification of the length between the end of the lever and point of attachment to the stationary element consist in a reversing lever one of whose ends is mounted on a joint connected to the stationary element, and whose other end is connected to the end of the reaction link, the reversing lever being fastened to an actuator connected to a stationary element by a joint.

According to an embodiment of the invention, the means for modification of the length between the end of the lever and the point of attachment to the stationary element consist of a reversing lever mounted on a joint connected to the stationary element, the reversing lever being connected at one of its ends to the end of the reaction link and being fastened at the other end to the rod of an actuator connected to a stationary element by a joint.

According to an embodiment of the invention, the means for modification of the length between the end of the lever and the point of attachment to the stationary element consist of an actuator placed between the reaction link along the axis of the reaction link between the end of the lever and the point of attachment.

According to an embodiment of the invention, the modification means are applied to the transmission control connector and consist of a modification of the length of the control connector by means of an actuator placed in the control connector along the axis of the control connector between the selector and the main control connecting rod.

According to an embodiment of the invention, the modification means are applied to the main control connecting rod and consist of two main half-links, each respectively comprising a lever solid with the main half-links, the end of one of the levers being connected to the end of the other lever by a connecting link, an actuator being placed in the connecting link and along the axis of the connecting link, the two main half-links being free in rotation relative to one another and connected in translation by a coupler.

According to an embodiment of the invention, the modification means are applied to the gear control lever and consist in the fact that the control lever comprises two control half-levers connected to one another by a joint in the selection plane, the two control half-levers each respectively comprising a lever solid with the control half-levers, the end of one of the levers being connected to the end of the other lever by a link, an actuator being placed in the link and along the axis of the link.

According to another embodiment of the invention, a second actuator is added to the modification means of the element of the kinematic chain under consideration to obtain a second selection state of the gears.

According to an embodiment of the invention, the actuator is placed in the reaction link along the axis of the reaction link between the end of the lever and the end of the reaction link, a position sensor being placed on the control connector.

According to an embodiment of the invention, the actuator consists of a cylinder.

According to an embodiment of the invention, the process of mechanical transmission manual control consists in the fact that the control in selection after the last gear of the first range triggers a control signal which simultaneously gives the order for shifting to the second range and change of state of the actuator.

According to an embodiment of the invention, the control process consists in the fact that a second signal emitted by a position sensor controls the change of state of a second actuator.

The mechanical transmission manual control device according to the invention thus has the advantage of offering a selection surface which can be reduced at will to offer the driver the best ergonomic position while preventing any false maneuver in the control of the different gears.

BRIEF DESCRIPTION OF THE DRAWINGS

The invention will be better understood by studying a particular embodiment unit described in way that is not at all limiting and illustrated by the accompanying drawings, in which.

DETAILED DESCRIPTION OF THE PREFERRED EMBODIMENTS

Figure 1:
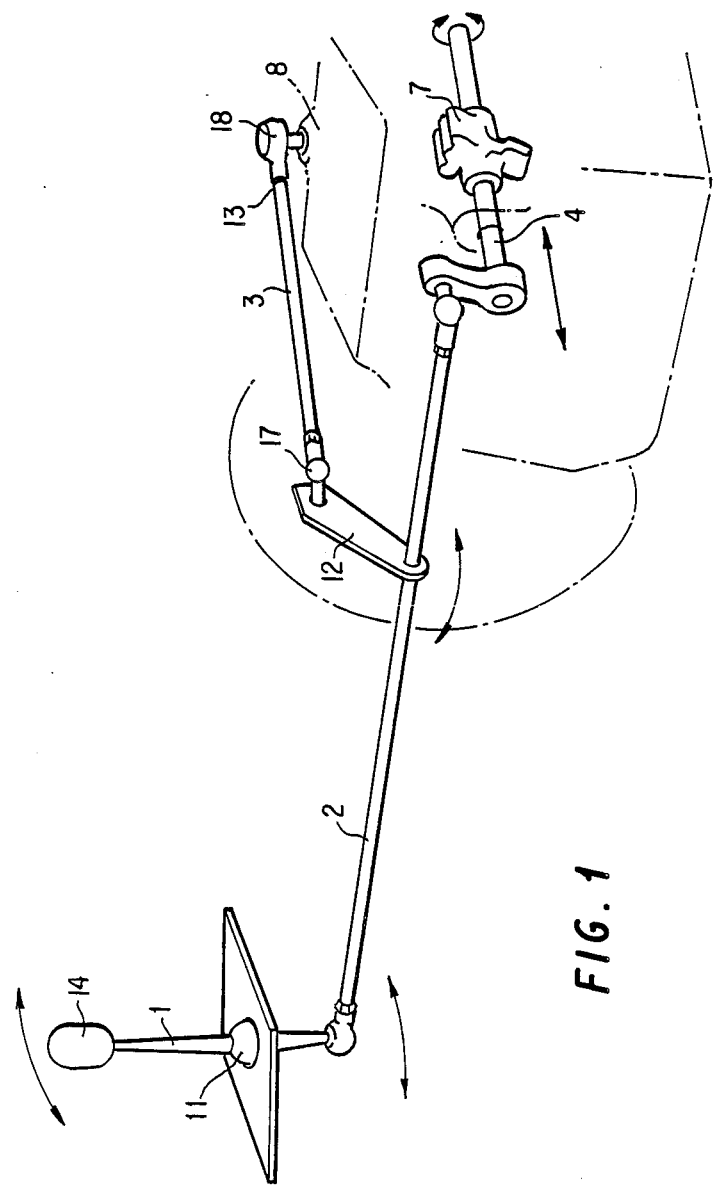
FIG. 1 is a perspective bird's eye view of a mechanical transmission manual control device to which the invention is applied.

The device according to the invention relates to a mechanical transmission manual control device. This manual control comprises a gear control lever 1 which has a knob 14, which is hinged around a shifting ball 11, and which operates a main control connecting rod 2. The main control connecting rod 2 is provided with a lever 12 which is solid with the main control connecting rod 2. A transmission control connector 4 is operated by the main control connecting rod 2. The transmission control connector 4 carries a selector 7.

On the other hand, the lever 12 works with a reaction link 3, which is connected by its other end 13 to a stationary element 8 to provide selection of gears.

The device according to the invention comprises means for modification of one of the elements of the kinematic chain placed between the knob 14 of the gear control lever 1 and the selector 7. This means that the modification means are applied either to control the lever 1, or to the main control connecting rod 2, or to the reaction link 3, or to the control connector 4, to be able to modify the relative position of the knob 14 of the gear control level 1 and the selector 7 in relation to one another.

FIG. 1 represents in a perspective bird's eye view a mechanical transmission manual control to which the device of the invention is applied.

Figure 2:
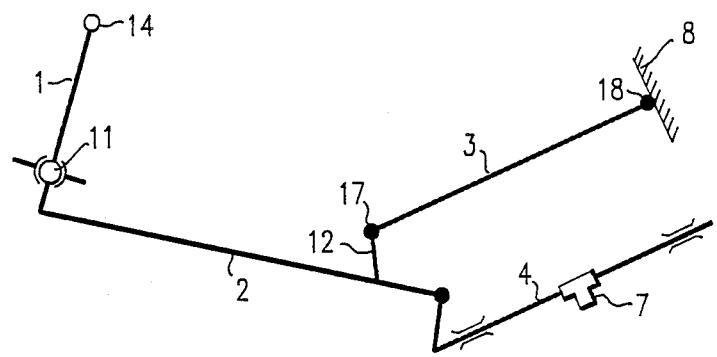
FIG. 2 is a diagrammatic view of FIG. 1.

FIG. 2 is a diagrammatic view corresponding to FIG. 1.

FIGS. 3, 4, 5, 6, 7, 8, 9 and 10 correspond to different embodiments of the mechanical transmission manual control device according to the invention.

The modification means which are applied to the reaction link 3 are represented in FIGS. 3, 4, 5, 6, and 10.

Figure 7:
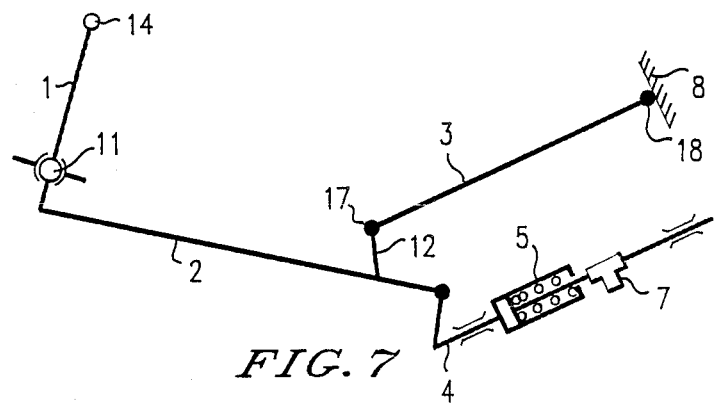
FIG. 7 is a diagrammatic view of a fifth embodiment of the invention.

The modification means which are applied to the control connector 4 are represented in FIG. 7.

Figure 9:
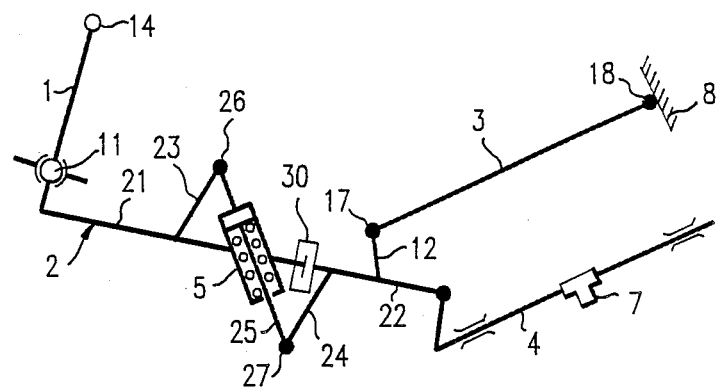
FIG. 9 is a diagrammatic view of a seventh embodiment of the invention.

The modification means which are applied to the main control connecting rod 2 are represented in FIG. 9.

Figure 8:
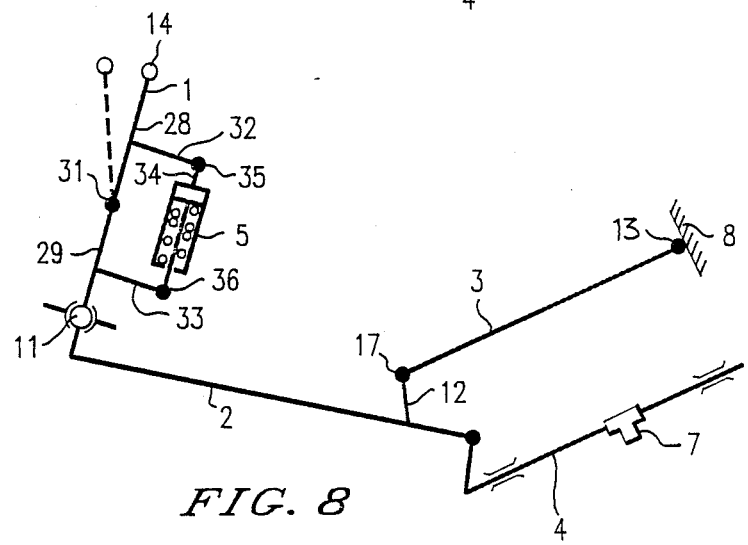
FIG. 8 is a diagrammatic view of a sixth embodiment of the invention.

The modification means which are applied to the gear control lever 1 are represented in FIG. 8.

The modification means which are applied to the reaction link 3 consist of a modification of the length of the reaction link 3 i.e., the length between an end 17 of the lever 12 on which the reaction link 3 is hinged and point of attachment 18 of the reaction link 3 to the stationary element 8.

Figure 3:
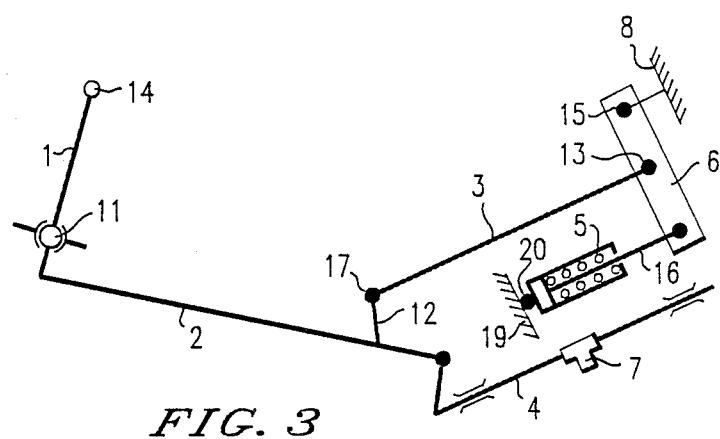
FIG. 3 is a diagrammatic view of a first embodiment of the invention.

In FIG. 3, the means for modification of the length between the end 17 of the lever 12 and the point of attachment 18 to the stationary element 8 consist of a reversing lever 6, one end of which is mounted on a joint 15 connected to the stationary element 8 and the other end of which is fastened to a rod 16 of an actuator 5 connected to a stationary element 19 by a joint 20. The reversing lever 6 is connected to the end 13 of the reaction link 3. In the case of FIG. 3, the actuator 5 is a cylinder that can be fed pneumatically.

Figure 4:
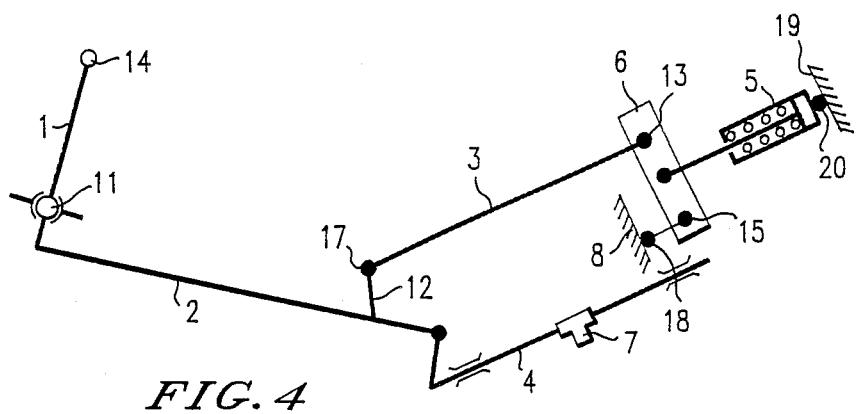
FIG. 4 is a diagrammatic view of a second embodiment of the invention.

The means for modification of the length between the end 17 of the lever 12 and the point of attachment 18 to the stationary element 8, represented in FIG. 4, consist a reversing lever 6 one of each of which is mounted on a joint 15 connected to the stationary element 8 and the other end of which is connected to the end 13 of the reaction link 3. The reversing lever 6 is fastened to an actuator 5, which is connected to a stationary element 19 by a joint 20. The actuator 5 is a cylinder which can be pneumatic.

Figure 5:
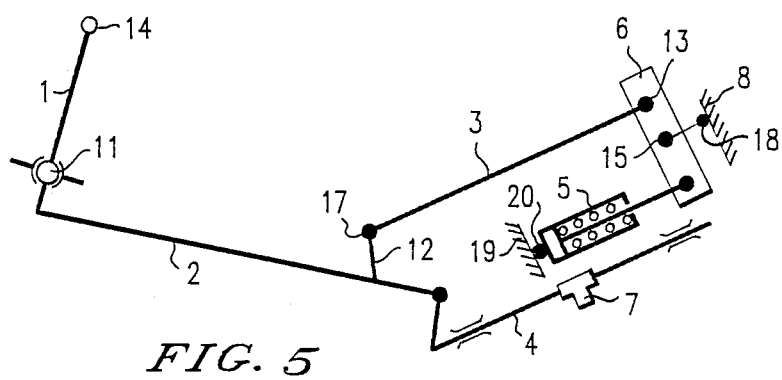
FIG. 5 is a diagrammatic view of a third embodiment of the invention.

FIG. 5 represents means for modification of the length between the end 17 of the lever 12 and the point of attachment 18 to the stationary element 8. These modification means consist of a reversing lever 6 which is mounted on a joint 15 connected to the stationary element 8. The reversing lever 6 is connected at one of its the ends to end 13 of the reaction link 3, and it is fastened at the other end to a rod 16 of an actuator 5. The actuator 5 is connected to a stationary element 19 by a joint 20. The actuator 5 is a cylinder that can be fed pneumatically.

Figure 6:
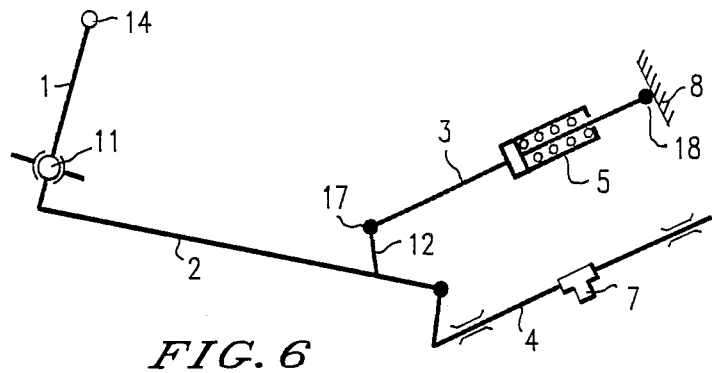
FIG. 6 is a diagrammatic view of a fourth embodiment of the invention.

FIG. 6 represents means for modification of the length between the end 17 of the lever 12 and the point of attachment 18 to stationary element 8; these means consist of an actuator 5 which is placed in the reaction link 3 and along the axis of the reaction link 3. The actuator 5 is thus located between the end 17 of the lever 12 and the point of attachment 18 to the stationary element 8. The actuator 5 is a cylinder that can be pneumatic.

FIG. 7 represents modification means that are applied to the transmission control connector 4. These means consist of a modification of the length of the transmission control connector 4 by means of an actuator 5. The actuator 5 is placed in the transmission control connector 4 and along the axis of the transmission control connector 4. This means that the actuator 5 is located between the selector 7 and the main control connecting rod 2. The actuator 5 is a cylinder that can be pneumatic.

FIG. 9 represents modification means that are applied to the main control connecting rod 2. These means consist of two main half-links 21 and 22, respectively. The main half-link 21 has an actuator lever 23, which is solid with it; and the main half-link 22 has an actuator lever 24 which is solid with it. An end 26 of the actuator lever 23 is connected to an end 27 of the actuator lever 24 by a connecting link 25. An actuator 5 is placed in the connecting link 25 along the axis of the connecting link 25. The two main half-links 21 and 22 are free in rotation relative to one another, and they are connected in translation by a coupler 30. The actuator 5 is a cylinder that can have pneumatic control.

FIG. 8 represents modification means that are applied to the gear control lever 1. These means consist of the control lever 1 comprising two control half-levers 28 and 29, respectively. These two control half-levers 28 and 29 are connected to one another by a joint 31 in the selection plane. The control half-lever 28 comprises a lever 32 which is solid with it, and the control half-lever 29 comprises a lever 33 which is solid with it. An end 35 of the lever 32 is connected and end 36 of the lever 33 by a link 34. An actuator 5 is placed in the link 34 and along the axis of the link 34. The actuator 5 is a cylinder that can have pneumatic control.

Figure 10:
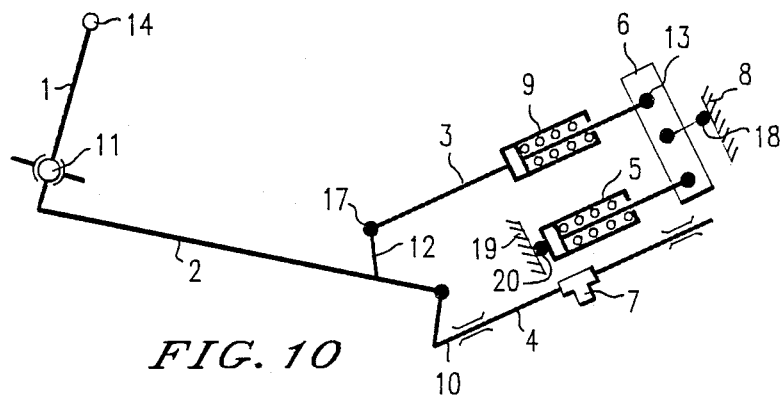
FIG. 10 is a diagrammatic view of an eight embodiment of the invention.

FIG. 10 represents a variant of FIG. 5. In the case of FIG. 10, a second actuator 9 is added in the reaction link 3 and along the axis of the reaction link 3.

The actuator 9 is thus placed between the end 17 of the lever 12 and the end 13 of the reaction link 3. Further, a position sensor 10 is placed on the transmission control connector 4. The actuator 9 is a cylinder that can be pneumatic.

According to the invention and in different embodiments, the actuator 5 is a slave to the control of the range change relay. The process of mechanical transmission manual control according to the invention consists in the fact that the control in selection after the last gear of the first range triggers a control signal. This control signal simultaneously gives the order to shift to the second range and the change of state of the actuator 5.

In the case of FIG. 10, the process of mechanical transmission manual control further comprises a second signal which is transmitted by the position sensor 10 and which controls the change of the state of the gear actuator 9. During the operation of control lever 1 to lead to a change of selection slot, the resulting movement of the transmission control connector 4 is recorded by the position sensor 10, and the induced signal causes a change of the state of actuator 9 which is mounted on the reaction link 3.

I claim:

1. A mechanical transmission manual control device comprising:
   (a) a manual gear control lever pivotally mounted on a shifting ball and having a manually operable portion at one end;
   (b) a transmission control connector including a selector;
   (c) a main control connecting rod connected between another end of said manual gear control lever and said transmission control connector, said main control connecting rod having a connecting rod lever fixed thereon;
   (d) a reaction link pivotally connected to said connecting rod lever; and
   (e) means for modifying one of said manual gear control lever, said transmission gear connector, said main control connecting rod, and said reaction link such that positions of said manually operable portion and said selector are changed relative to one another, said means comprising:
      (i) an actuator connected to a stationary element and
      (ii) a reversing lever having one end pivotally connected to said stationary element and another end pivotally connected to a movable rod of said actuator, said reaction link being pivotally connected to a mid-portion of said reversing lever.

2. A mechanical transmission manual control device comprising:
   (a) a manual gear control lever pivotally mounted on a shifting ball and having a manually operable portion at one end;
   (b) a transmission control connector including a selector;
   (c) a main control connecting rod connected between another end of said manual gear control lever and said transmission control connector, said main control connecting rod having a connecting rod lever fixed thereon;
   (d) a reaction link pivotally connected to said connecting rod lever; and
   (e) means for modifying one of said manual gear control lever, said transmission gear connector, said main control connecting rod, and said reaction link such that positions of said manually operable portion and said selector are changed relative to one another, said means comprising:
      (i) an actuator connected to a stationary element and
      (ii) a reversing lever having one end pivotally connected to said stationary element and another end pivotally connected to said reaction link, a movable rod of said actuator being pivotally connected to a mid-portion of said reversing lever.

3. A mechanical transmission manual control device comprising:
   (a) a manual gear control lever pivotally mounted on a shifting ball and having a manually operable portion at one end;
   (b) a transmission control connector including a selector;
   (c) a main control connecting rod connected between another end of said manual gear control lever and said transmission control connector, said main control connecting rod having a connecting rod lever fixed thereon;
   (d) a reaction link pivotally connected to said connecting rod lever; and
   (e) means for modifying one of said manual gear control lever, said transmission control connector, said main control connecting rod, and said reaction link such that positions of said manually operable portion and said selector are changed relative to one another, said means comprising an actuator connected along the length of said transmission control connector.

4. A mechanical transmission manual control device comprising:

(a) a manual gear control lever pivotally mounted on a shifting ball and having a manually operable portion at one end;
(b) a transmission control connector including a selector;
(c) a main control connecting rod connected between another end of said manual gear control lever and said transmission control connector, said main control connecting rod having a connecting rod lever fixed thereon and being formed in two halves which are freely rotatable relative to one another;
(d) a reaction link pivotally connected to said connecting rod lever; and
(e) means for modifying one of said manual gear control lever, said transmission control connector, said main control connecting rod, and said reaction link such that positions of said manually operable portion and said selector are changed relative to one another, said means comprising:
  (i) a rotational coupler connected along the length of said main control connecting rod;
  (ii) two actuator levers, one of said two actuator levers being fixed to said main control connecting rod at each side of said rotational coupler, said two actuator levers extending at an angle to the length of said main control connecting rod; and
  (iii) an actuator pivotally connected between said two actuator levers.

5. A mechanical transmission manual control device comprising:
(a) a manual gear control lever pivotally mounted on a shifting ball and having a manually operable portion at one end, said manual gear control lever being formed in two halves which are pivotable relative to one another;
(b) a transmission control connector including a selector;
(c) a main control connecting rod connected between another end of said manual gear control lever and said transmission control connector, said main control connecting rod having a connecting rod lever fixed thereon;
(d) a reaction link pivotally connected to said connecting rod lever; and
(e) means for modifying one of said manual gear control lever, said transmission gear connector, said main control connecting rod, and said reaction link such that positions of said manually operable portion and said selector are changed relatively to one another, said means comprising:
  (i) a pivotal joint connected along the length of said manual gear control lever;
  (ii) two actuator levers, one of said two actuator levers being fixed to said manual gear control lever at each side of said pivotal joint, said two actuator levers extending at an angle to the length of said manual gear control lever; and
  (iii) an actuator pivotally connected between said two actuator levers.

6. A mechanical transmission manual control device comprising:

(a) a manual gear control lever pivotally mounted on a shifting ball and having a manually operable portion at one end;
(b) a transmission control connector including a selector;
(c) a main control connecting rod connected between another end of said manual gear control lever and said transmission control connector, said main control connecting rod having a connecting rod lever fixed thereon;
(d) a reaction link pivotally connected to said connecting rod lever; and
(e) means for modifying one of said manual gear control lever, said transmission gear connector, said main control connecting rod, and said reaction link such that positions of said manually operable portion and said selector are changed relative to one another, said means comprising:
  (i) an actuator connected to a stationary element and
  (ii) a reversing lever having one end pivotally connected to said reaction link and another end pivotally connected to a movable rod of said actuator, a mid-portion of said reversing lever being pivotally connected to said stationary element.

7. The device of any one of claims 1–6 wherein said actuator comprises a fluid pressure actuated cylinder.

8. The device of claim 6 and further comprising a second actuator connected along the length of said reaction link.

9. The device of claim 8 wherein each of said actuators comprises a fluid pressure actuated cylinder.

10. The device of claim 9 and further comprising a link position sensor mounted on said transmission control connector.

11. A process of mechanical transmission control in a manual transmission comprising:
(a) a manual gear control lever pivotally mounted on a shifting ball and having a manually operable portion at one end;
(b) a transmission control connector including a selector;
(c) a main control connecting rod connected between another end of said manual gear control lever and said transmission control connector, said main control connecting rod having a connecting rod lever fixed thereon; control connecting rod having a connecting rod lever fixed thereon;
(d) a reaction link pivotally connected between said connecting rod lever and a stationary element;
(e) means including at least one fluid pressure actuated actuator for modifying one of said manual gear control lever, said transmission control connector, said main control connecting rod, and said reaction link; and
(f) a position sensor,
wherein said process comprises the steps of:
(g) sensing the selection of the last gear of a first range with said position sensor and
(h) simultaneously actuating said at least one fluid pressure actuated actuator to shift positions such that a second selection range can be achieved.

* * * * *